(12) United States Patent
Chabanne et al.

(10) Patent No.: US 11,507,690 B2
(45) Date of Patent: Nov. 22, 2022

(54) METHOD OF ENROLLING DATA TO CONTROL AN IDENTITY, AND IDENTITY-CONTROL METHOD

(71) Applicant: IDEMIA IDENTITY & SECURITY FRANCE, Courbevoie (FR)

(72) Inventors: Herve Chabanne, Issy les Moulineaux (FR); Sebastien Bahloul, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 707 days.

(21) Appl. No.: 16/360,820

(22) Filed: Mar. 21, 2019

(65) Prior Publication Data

US 2019/0294816 A1 Sep. 26, 2019

(30) Foreign Application Priority Data

Mar. 21, 2018 (FR) ........................ 1852407

(51) Int. Cl.
*G06F 21/62* (2013.01)
*G06F 16/23* (2019.01)
(Continued)

(52) U.S. Cl.
CPC ...... *G06F 21/6245* (2013.01); *G06F 16/2379* (2019.01); *G07C 9/22* (2020.01);
(Continued)

(58) Field of Classification Search
CPC .......... G06F 21/30; G06F 21/31; G06F 21/32; G06F 21/60; G06F 21/602; G06F 21/604;
(Continued)

(56) References Cited

U.S. PATENT DOCUMENTS

| 5,426,700 A | 6/1995 | Berson |
| 2004/0133804 A1* | 7/2004 | Smith ................... G06Q 10/10 713/186 |

(Continued)

FOREIGN PATENT DOCUMENTS

| EP | 2869240 A2 | 5/2015 |
| FR | 3047688 A1 | 8/2017 |

OTHER PUBLICATIONS

Preliminary Research Report and Written Opinion received for French Application No. 1852407, dated Jan. 15, 2019, 11 pages (1 page of French Translation Cover Sheet and 10 pages of original document).

*Primary Examiner* — Malcolm Cribbs
(74) *Attorney, Agent, or Firm* — Womble Bond Dickinson (US) LLP

(57) ABSTRACT

The present invention comprises an enrolment method comprising steps of: acquisition (100) of an image showing a photograph itself showing an individual, extraction (102), from the image of a characteristic of the image other than a biometric model, obtaining (104) personal data of the individual other than by the image-processing algorithm, generation (106) of a reference datum (W) from the characteristic of the image and the obtained personal data, calculation (108) of an encoded datum (s) by application of an encoding procedure to the reference datum (W) and to a random datum (c), calculation (110) of a hash (h(c)) of the random datum, storage (112) in a database of the datum encoded (s) in association with the hash. The invention also comprises an identity-control method using such stored data.

13 Claims, 3 Drawing Sheets

(51) Int. Cl.
*H04L 9/06* (2006.01)
*G07D 7/202* (2016.01)
*G07D 7/2033* (2016.01)
*G07D 7/20* (2016.01)
*G07C 9/22* (2020.01)
*G07C 9/37* (2020.01)
*G06V 10/88* (2022.01)

(52) U.S. Cl.
CPC ............ *G07C 9/37* (2020.01); *G07D 7/2016* (2013.01); *G07D 7/2033* (2013.01); *G07D 7/2041* (2013.01); *H04L 9/0643* (2013.01); *G06V 10/88* (2022.01); *G07C 2209/02* (2013.01)

(58) Field of Classification Search
CPC .. G06F 21/62; G06F 21/6245; G06F 16/2379; G07C 9/22; G07C 9/37; G07C 2209/02; G07D 7/2016; G07D 7/2033; G07D 7/2041; H04L 9/0643; G06K 9/58
See application file for complete search history.

(56) References Cited

U.S. PATENT DOCUMENTS

| | | | |
|---|---|---|---|
| 2008/0235515 A1* | 9/2008 | Yedidia | G06K 9/0061 713/186 |
| 2014/0068740 A1* | 3/2014 | LeCun | G06K 9/4676 726/7 |
| 2016/0300414 A1 | 10/2016 | Lambert et al. | |
| 2017/0004506 A1* | 1/2017 | Steinman | G06Q 20/4016 |
| 2017/0236355 A1 | 8/2017 | Chabanne et al. | |
| 2018/0145977 A1* | 5/2018 | Murakami | H04L 63/0869 |
| 2018/0189583 A1* | 7/2018 | Wohlken | G06K 9/6201 |
| 2019/0266314 A1* | 8/2019 | Trelin | G06K 9/00899 |

* cited by examiner

METHOD OF ENROLLING DATA TO CONTROL AN IDENTITY, AND IDENTITY-CONTROL METHOD

FIELD OF THE INVENTION

The present invention relates to a data enrolment method intended to be used to check the identity of an individual, and an identity-control process.

PRIOR ART

Document FR3047688 discloses a data enrolment method intended to be used to check the identity of an individual, comprising storing encoded and hashes in a database for the purpose of using them to control the identity of an individual. Document FR3047688 also describes an identity-control method reusing the data stored in the database.

The database does not indicate which one is the individual associated with an encoded datum and a hash, that is, the individual from whom these data have been generated. In this way, a third-party having access to this database cannot normally know which one is the individual who is associated with an encoded datum and a hash.

Yet these data produced from an individual then stored in the database can have low entropy. Therefore, an attack by dictionary made on the database could allow a malicious person to determine the individual who is associated with an encoded datum and a hash.

SUMMARY OF THE INVENTION

An aim of the invention is to better protect data stored in a database for the purpose of using them to control the identity of an individual from attacks by dictionary.

For this reason, according to a first aspect of the invention a method of enrolling data intended to be used to control the identity of an individual is proposed, the method comprising steps of:
  acquisition of a reference image showing a photograph, the photograph itself showing a reference individual,
  extraction, from the reference image and by an image-processing algorithm, of a characteristic of the reference image other than a biometric model, wherein the image-processing algorithm is configured to:
    extract, from any image showing a photograph itself showing the reference individual, a characteristic which differs from the characteristic of the reference image by a deviation less than a determined threshold,
    extract, from any image not showing the reference individual, a characteristic which differs from the characteristic of the reference image by a deviation greater than the determined threshold,
  generation of a reference datum from the characteristic of the reference image
  calculation of an encoded datum by application of an encoding procedure to the reference datum and to a random datum,
  calculation of a hash of the random datum by application of a predetermined cryptographic function to the random datum,
  storage in a database of the datum encoded in association with the hash, for the purpose of using them to control the identity of an individual,
The method also comprises a step for obtaining personal data of the reference individual other than by the image-processing algorithm, the reference datum also being generated from obtained personal data.

According to a second aspect of the invention, an identity-control method is also proposed, comprising steps of:
  acquisition of a control image showing a photograph, the photograph itself showing an individual,
  extraction, from the control image and by an image-processing algorithm, of a characteristic of the control image other than a biometric model, wherein the image-processing algorithm is configured to:
    extract, from any image showing a photograph itself showing a reference individual, a characteristic which differs from the characteristic of the control image by a deviation less than a determined threshold,
    extract, from any image not showing the reference individual, a characteristic which differs from the characteristic of the control image by a deviation greater than the determined threshold,
  obtaining personal data of an individual other than by the image-processing algorithm,
  generation of a control datum from the characteristic of the control image and from the obtained personal data,
  reading, in a database, of an encoded datum and of a hash of a random datum associated with the reference individual,
  calculation of a decoded datum by application of a decoding procedure to the control datum and to the read encoded datum,
  application of a predetermined cryptographic function to the decoded datum so as to produce a hash of the decoded datum,
  comparison between the obtained hash and the read hash,
  generation of a result of identity control indicating whether the individual shown by the photograph and the individual targeted by the obtained personal data both correspond to the reference individual or not, as a function of the comparison.

It is understood that the method according to the first aspect of the invention and the second method according to the second aspect of the invention can be executed consecutively. They can be executed by the same device, or be executed by two different devices.

The method according to the first aspect of the invention and the second method according to the second aspect of the invention can comprise the following characteristics, taken singly or in combination.

The encoding procedure can be a sketch procedure of an algorithm of "secure sketch" type. The decoding procedure can be a recovery procedure of an algorithm of "secure sketch" type.

The personal data can comprise civil status data.

The acquired image can show an identity document comprising the photograph, and the civil status data can be extracted from the acquired image by optical character recognition.

The personal data can comprise a biometric model.

The biometric model can be generated from the acquired image.

The reference or control datum can be a concatenation of the extracted characteristic and of each personal datum.

Generating the datum depending on the characteristic extracted and the obtained personal data can comprise a predetermined permutation of the extracted characteristic and the personal data prior to their concatenation.

The characteristic of the acquired image is for example a histogram of graded orients.

According to a third aspect of the invention, a computer program product is proposed, comprising program code instructions for executing the steps of the method according to the first and/or the second aspect of the invention, when this method is executed by at least one processor.

DESCRIPTION OF FIGURES

Other features, aims and advantages of the invention will emerge from the following description which is purely illustrative and non-limiting and which must be considered with respect to the appended drawings, in which.

In all figures, similar elements bear identical references.

DETAILED DESCRIPTION OF THE INVENTION

Figure 1:
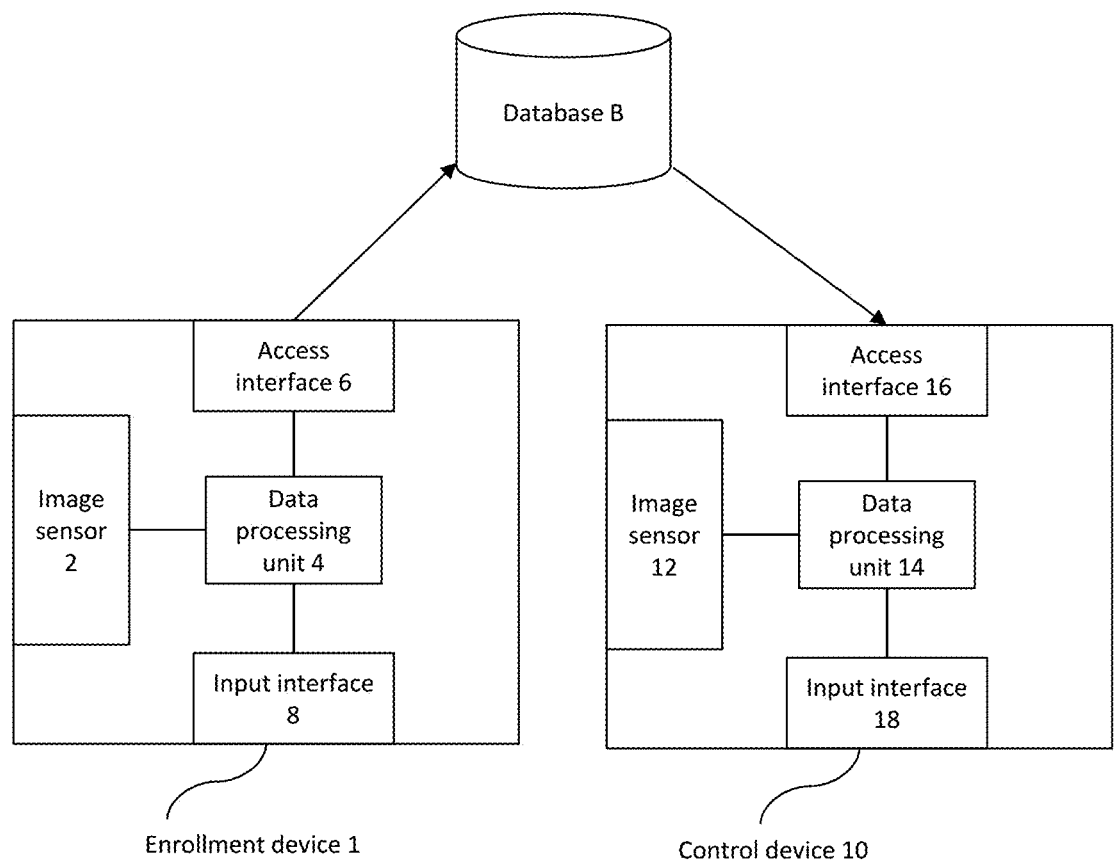
FIG. 1 schematically illustrates a database, an enrolment device and a control device according to an embodiment of the invention.

In reference to FIG. 1, an enrolment device 1 comprises an image sensor 2, a data-processing unit 4 and an access interface 6 to access a database B.

The image sensor 2 is typically a photo apparatus or a camera.

The data-processing unit 4 comprises at least one processor configured to execute an image-processing algorithm applicable to an image acquired by the image sensor 2.

The image-processing algorithm is configured to extract from an image showing a photograph, the photograph itself showing a reference individual, a characteristic of this image which is not a biometric model.

The image-processing algorithm is also configured to:
  extract, from any image showing a photograph itself showing the reference individual, a characteristic which differs from the characteristic of the reference image by a deviation less than a determined threshold,
  extract, from any image not showing the reference individual, a characteristic which differs from the characteristic of the reference image by a deviation greater than the determined threshold.

Image-processing algorithms fulfilling these conditions are known to the person skilled in the art.

In an embodiment, the image-processing algorithm is a classification algorithm of the type employing a convolutional network of neurones, also known under the acronym CNN (in English Convolutional Neural Network).

In another embodiment, the image-processing algorithm is of the type employing a HOG descriptor, that is, a histogram descriptor of graded orients. The extracted characteristic other than a biometric model is or comprises its histogram of graded orients.

The person skilled in the art can refer to document FR3047688 to obtain additional details on these two examples of image-processing algorithms fulfilling the above conditions.

Also, the data-processing unit 4 comprises at least one processor configured to execute an encoding procedure (this processor being identical or different to that used to execute the image-processing algorithm).

The encoding procedure is preferably a sketch procedure of an algorithm of "secure sketch" type. This secure sketch procedure is known to the person skilled in the art and is described especially in the document "Fuzzy Extractors: How to Generate Strong Keys from Biometrics and Other Noisy Data", by Dodis et al. (see the definition 3 given on page 11 of this document).

Other encoding procedures however can be used by the processing unit 4 in place of a sketch procedure (for example procedures of algorithms of "fuzzy extractor" type).

In general, the enrolment device 1 comprises obtaining means for obtaining personal data relating to an individual in a way other than via the image-processing algorithm.

These obtaining means differ according to the type of personal datum considered.

The personal data can comprise for example a biometric model specific to an individual, produced by a biometric sensor. This biometric sensor can in turn comprise the image sensor 2 and/or the data-processing unit 4. This is advantageous as a biometric model and a characteristic other than a biometric model can be produced from an image acquired by means of the same image sensor 2. The overall cost of the enrolment device is accordingly reduced.

As a variant or in addition, the personal data can comprise civil status data of an individual. The obtaining means of the enrolment device 1 for obtaining civil status data can comprise an input interface 8 (keypad, touch screen, etc.) utilisable by a user. As a variant or in addition, the obtaining means comprise a character recognition algorithm executed on an image showing these civil status data in the form of text. In the event where a character recognition algorithm is used, this can be executed by the data-processing unit 4 of the device 1 on the basis of an image acquired by the image sensor 2.

The database B is typically external to the enrolment device 1, as shown in FIG. 1. In this case, the access interface 6 to access the database B comprises a communications interface network letting device communicate via network with the database B, whether by a wireless network of radio type (Wi-Fi, etc.) or wired network.

The database B is for example a distributed database of "blockchain" type. In this case, the database is stored on several servers.

Alternatively, the enrolment device 1 comprises a memory storing all or part of the database, in which case the access interface to the database comprises this memory.

The access interface 6 lets the enrolment device write data in the database B.

FIG. 1 also shows an identity control device 10 which comprises an image sensor 12, a data-processing unit 14, and an access interface 16 to the database B.

The image sensor 12, the data-processing unit 14 and the access interface 16 are for example identical to the elements 2, 14, 16 of the same name of the enrolment device 1, except that:
  The data-processing unit 14 comprises at least one processor configured to execute a decoding procedure adapted to decode data coded by the coding procedure used by the enrolment device,
  The access interface lets the control device access the database for reading.

When the encoding procedure used by the enrolment device is a sketch procedure of an algorithm of "secure sketch" type, the decoding procedure is the recovery procedure of the same algorithm of "secure sketch" type. Such a recovery procedure is also known to the person skilled in the art (see the above definition 3 given on page 11 of the document "Fuzzy Extractors: How to Generate . . . ").

The devices 1 and 10 can in fact be one and the same device combining the functions of enrolment and identity control, in which case the two procedures of the "secure sketch" (sketch and recovery) algorithm are likely to be executed by the data-processing unit.

Each of the devices 1 and 10 can be in the form of a high-performance mobile telephone such as a smartphone, or else a digital tablet, or even of a computer or of equipment for automatically authenticating identity documents such as the device marketed by Idemia under the name B5000.

The database B is for example stored by a remote server of the device 1 and/or of the device 10.

The devices 1, 10 and this server can communicate directly for example by radiofrequency or by means of a network.

The device 10 is supposed to be used by a legitimate user, such as a government organisation to which it belongs, that is, a non-fraudulent user. However, the device 10 can also be used by a malicious user, that is, a fraudulent user. This fraudulent user can be either a person or a digital entity.

Figure 2:
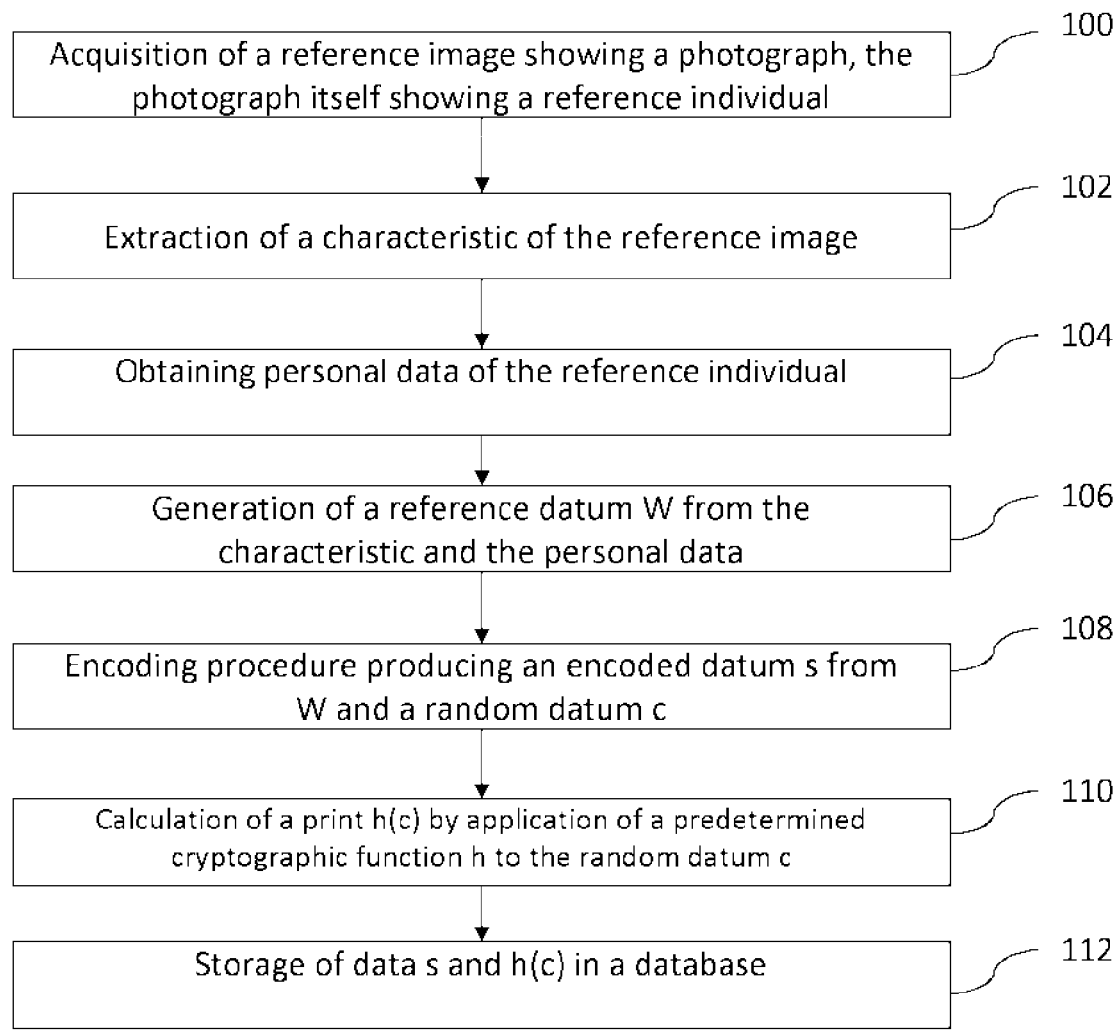
FIG. 2 is a flowchart of steps of a enrolment method according to an embodiment of the invention.

In reference to FIG. 2, a data enrolment method associated with a reference individual executed by the enrolment device comprises the following steps.

The image sensor acquires a reference image showing a photograph, the photograph itself showing the reference individual (step 100). Photograph showing an individual means a photograph showing at least part of the body of the individual, this part of the body allowing to distinguish this individual from other individuals (face, ear or fingerhashs, for example).

For instance, an image showing an identity document of the reference individual comprising a photograph itself showing the face of the reference individual is acquired for example during the acquisition step 100. The identity document is for example a passport, a national identity card, a driving license, etc.

The image-processing algorithm executed by the processing unit 4 extracts from the reference image a characteristic of this image (step 102). As indicated previously, this characteristic is not a biometric model. This characteristic is for example a histogram of oriented gradients (HOG).

The enrolment device 1 also obtains personal data of the reference individual by means other than with the image-processing algorithm (step 104).

The personal data comprise for example a biometric model specific to the reference individual and/or civil status data of the reference individual, obtained by any of the means described previously. If the personal data of the reference individual comprise a biometric model, this model is preferably generated by the enrolment device 1 from the reference image. If the personal data of the reference individual comprise civil status data, they can be input into the device via the input interface 8 or else extracted from the reference image by optical character recognition.

The data-processing unit 4 then generates a reference datum W not only from the characteristic extracted by means of the image-processing algorithm during the step 102, but also from the personal data of the reference individual obtained during the step 104.

The reference datum W is typically a concatenation of the characteristic and of each reference datum, given that the characteristic and each reference datum can be considered as sequences of bits. The number of bits of the reference datum is therefore the sum of the respective numbers of bits of the characteristic and of each personal datum in the case of such concatenation.

The joint use of these two independent sources contributes entropy to the datum W in the sense that the number of values of the reference datum is increased relative to a datum which would depend on one or the other of these source data only.

The data-processing unit 4 applies the encoding method (for example sketch procedure of an algorithm of "secure sketch type) to the reference datum W (step 108).

The encoding procedure takes a random datum as another input datum. As its name indicates, the random datum is a datum of random value contributing an unknown. This random datum is typically an error correction code.

The encoding procedure produces an encoded datum s from the reference datum and the random datum c during the step 108. In the event where a sketch procedure is used, this datum s is a sketch datum.

The data-processing unit 4 also calculates a hash h(c) of the random datum by application of a predetermined cryptographic function h to the random datum c (step 110). This cryptographic function is a hash function for example.

The data-processing unit 4 controls storage, via the access interface, of the encoded datum s and of the hash h(c) in the database B in association with each other (step 112). Data s and h(c) are implicitly associated with the reference individual since it is on the basis of information specific to this reference individual that the encoded datum s has been generated and since the random datum has been combined during the encoding procedure with the reference datum W.

Figure 3:
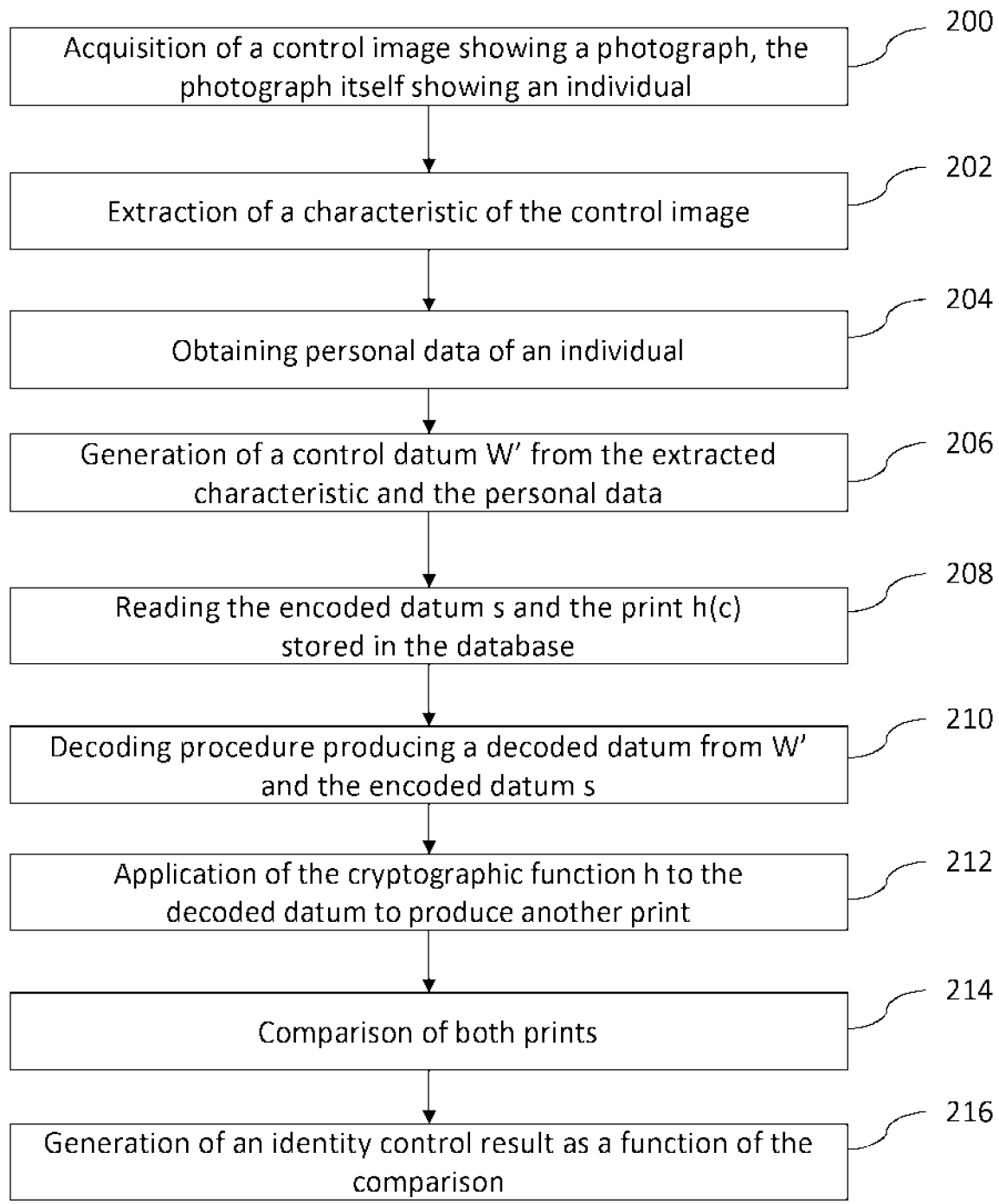
FIG. 3 is a flowchart of steps of an identity-control method of an individual, according to an embodiment of the invention.

In reference to FIG. 3, an identity-control method of an individual executed by the control device 10 comprises the following steps.

This method is executed, for example to prepare access to a secure zone, for example a secure zone of an airport.

In the following, it is assumed that a first individual presents at a checkpoint where the identity control device 10 is located. This first individual is holding an identity document showing a photograph, the photograph itself showing a second individual. If the identity document is authentic, the second individual is of course the first individual. But if the identity document has been stolen from its rightful owner or has been falsified (typically by replacement of one photograph by another), the second individual can be different to the first individual. This type of fraud has to be detected.

The image sensor 12 acquires a control image showing the photograph itself showing the second individual (step 200). During the acquisition step 200 a control image showing the identity document held by the first individual is acquired for example, comprising a photograph itself showing the face of the reference individual. The identity document is for example a passport, a national identity card, a driving license, etc.

The image-processing algorithm executed by the data-processing unit 14 extracts from the control image a characteristic of this image. This characteristic is of the same type as that extracted during the step 102 conducted during the enrolment method described earlier. The characteristic is therefore not a biometric model. This characteristic is for example a histogram of graded orients.

The identity control device 10 also obtains personal data of the reference individual by means other than with the image-processing algorithm (step 204).

The personal data obtained during the step 204 have the same composition as the personal data obtained during the step 104 of the enrolment method (biometric model specific to the first individual and/or civil status data of an individual for example).

As described previously, the civil status data can be input into the identity control device 10 via the input interface 16 which can be used either by the first individual or by a user controlling the identity of the first individual. Alternatively, the civil status data obtained during the step 204 can be extracted from the control acquired image, by optical character recognition.

The data-processing unit 14 then generates a control datum W' (step 206), not only from the characteristic extracted by means of the image-processing algorithm during the step 202 but also from the personal data of the reference individual obtained during the step 204.

The control datum W' is generated in the same way as the reference datum W during the step 106.

It is impossible for the control datum W' to be equal to the datum W, even if the first individual and the second individual are actually the reference individual. In fact, the reference image and the control images are different images, acquired at different moments and therefore in different conditions, so that the characteristics extracted respectively from these two images cannot be perfectly identical. But due to the intrinsic properties of the image-processing algorithm used the characteristic extracted during the step 204 is comparatively closer to the reference characteristic if the control image shows the reference individual, than if this is not the case.

The personal data obtained during steps 104 and 204 also contribute to accentuating the potential differences between the data W and W'. In particular, the biometric model extracted from the control image will be obviously closer to the biometric reference model in the event where the first individual presenting proves to be the reference individual.

The control datum W' is for example a concatenation of the characteristic of the control image and each reference datum obtained during the control, given that the characteristic and each reference datum can be considered as sequences of bits. The number of bits of the noisy datum is therefore the sum of the numbers of respective bits of the characteristic and of each personal datum in the case of such concatenation.

Joint use of these two independent sources contributes entropy in the sense that the number of values of the control datum W' is increased, as was also the case of the datum W generated during enrolment.

The data-processing unit 14 controls reading, via the access interface, of the encoded datum s and of the hash h(c) associated with each other in the database B.

The data-processing unit 14 applies the decoding procedure (for example recovery procedure of the algorithm "secure sketch") to the control datum W' and the encoded datum s read in the database so as to produce a decoded datum.

The decoding procedure is such that if the control datum W' is sufficiently close to the reference datum W, the decoded datum is equal to the random datum c having served during the encoding procedure to produce the datum encoded s. "Sufficiently close" means that a distance between W and W' is less than a predetermined threshold, typically a Hamming distance.

However, if the control datum W' is sufficiently far from the reference datum W, then the decoded datum and the random datum have different values. "Sufficiently far away" means that the distance between W and W' is under the predetermined threshold.

The data-processing unit 14 then applies the cryptographic function h to the decoded datum to obtain a hash (step 212).

The processing unit then compares the hash h(c) read in the database during the step 208 and the hash calculated during the step 212 (step 214).

The data-processing unit 14 generates an identity control result indicating whether the individual shown by the photograph and the owner individual both correspond to the reference individual or not, as a function of the comparison 212 (step 216).

When the two compared hashs are identical, the result of identity control is a positive result indicating that the individual shown by the photograph and the individual targeted by the personal data obtained during the step 204 both correspond to the reference individual referenced in the database. It can be considered that these elements are sufficient proof to conclude that the individual who is presenting at the check point is correctly referenced in the database and therefore he can gain access to the secure zone.

When the two compared hashs are different, the identity control result is a negative result indicating that at least one of the individuals shown by the photograph and the individual targeted by the personal data obtained during the step 204 does not correspond to the reference individual referenced in the database.

The steps for reading 208 in the database, calculation 210 of decoded datum, calculation 212 of hash, comparison 214 and generation 216 of control result can be repeated for each encoded datum and associated hash present in the database.

If all the results of identity control obtained on completion of these repetitions are negative, the data-processing unit 14 can generate a result indicating that the individual who presented at the check point is not referenced in the database. The decision can be taken not to authorize the individual who presented to access the secure zone.

In the above, the assumption has been made that the enrolled reference individual is an individual likely to obtain access to a secure zone (the database B now acting as a white list). Alternatively, it can be possible that the individuals referenced in the database are instead individuals prohibited from accessing such a zone (the database B now acting as a black list).

The invention claimed is:

1. A method of enrolling data intended to be used to check the identity of an individual, the method comprising steps of:
   acquiring a reference image showing a photograph, the photograph itself showing a reference individual,
   extracting from the reference image and by an image-processing algorithm a characteristic of the reference image other than a biometric model
   obtaining personal data of the reference individual other than by the image-processing algorithm;
   generating a reference datum from the characteristic of the reference it and from the obtained personal data,
   computing an encoded datum by applying an encoding procedure to the reference datum and to a random datum,
   computing a hash of the random datum by applying a predetermined cryptographic function to the random datum,
   storing in a database the datum encoded in association with the hash, for the purpose of using the datum encoded and the hash to control the identity of an individual,
   wherein a deviation between the characteristic and another characteristic extracted by the image processing algorithm from another image is:

less than a determined threshold whenever the another image shows a photograph itself showing the reference individual, and greater than the determined threshold whenever the another image does not show a photograph itself showing the reference individual.

2. The method according to claim 1, wherein the encoding procedure is a sketch procedure of an algorithm of "secure sketch" type.

3. An identity control method comprising steps of:

acquiring a control image showing a photograph, the photograph itself showing a first individual, extracting from the control image and by an image-processing algorithm a characteristic of the control image other than a biometric model, obtaining personal data of a second individual other than by the image-processing algorithm, generating a control datum from the characteristic of the control image and from the obtained personal data, reading, in a database, an encoded datum and of a hash of a random datum associated with a reference individual, computing a decoded datum by application of a decoding procedure to the control datum and to the read encoded datum, applying a predetermined cryptographic function to the decoded datum so as to produce a hash of the decoded datum, comparing the hash of the decoded datum and the read hash, outputting a control identity result indicating whether the first individual and the second individual both correspond to the reference individual or not, as a function of the comparison, wherein a deviation between the characteristic and another characteristic extracted by the image processing algorithm from another image is:

less than a determined threshold whenever the another image shows a photograph itself showing the first individual, and greater than the determined threshold whenever the another image does not show a photograph itself showing the first individual.

4. The method according to claim 3, wherein the decoding procedure is a recovery procedure of an algorithm of "secure sketch" type.

5. The method according to claim 1 or claim 3, wherein the personal data comprise civil status data.

6. The method according to claim 1 or claim 3, wherein the acquired image shows an identity document comprising the photograph, and wherein the civil status data are extracted from the acquired image by optical character recognition.

7. The method according to claim 1 or claim 3, wherein the personal data comprise a biometric model.

8. The method according to claim 7, wherein the biometric model is generated from the acquired image.

9. The method according to claim 1 or claim 3, wherein the reference (W) or control (W') datum is a concatenation of the extracted characteristic and of each personal datum.

10. The method according to claim 1 or claim 3, wherein generating the datum depending on the extracted characteristic and the obtained personal data comprises permuting then concatenating the characteristic extracted and the personal data.

11. The method according to claim 1 or claim 3, wherein the characteristic of the acquired image comprises a histogram of oriented gradients.

12. A non-transitory computer program comprising program code instructions for executing the steps of the method according to claim 1, when this method is executed by at least one processor.

13. A non-transitory computer program comprising program code instructions for executing the steps of the method according to claim 3, when said method is executed by at least one processor.

* * * * *